United States Patent
Gala et al.

(10) Patent No.: US 8,954,953 B2
(45) Date of Patent: Feb. 10, 2015

(54) SYSTEMS AND METHODS FOR DEPLOYING A CUSTOMIZED OPERATING SYSTEM

(71) Applicant: Dell Products L.P., Round Rock, TX (US)

(72) Inventors: Kaushal Shailesh Gala, Austin, TX (US); Michael Josef Regert, Round Rock, TX (US); Umer Shabbir, Round Rock, TX (US); Sangita Sunil Pandit, Austin, TX (US); Jerry J. Haskins, Leander, TX (US); Raajeev Kalyanaraman, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 49 days.

(21) Appl. No.: 13/786,918

(22) Filed: Mar. 6, 2013

(65) Prior Publication Data

US 2014/0259010 A1 Sep. 11, 2014

(51) Int. Cl.
*G06F 9/44* (2006.01)
*G06F 9/445* (2006.01)

(52) U.S. Cl.
CPC .................................... *G06F 8/63* (2013.01)
USPC ............ 717/174; 717/168; 717/176; 717/178

(58) Field of Classification Search
CPC ............... G06F 8/60; G06F 8/63; G06F 8/61; G06F 8/70; G06F 9/44505
See application file for complete search history.

(56) References Cited

U.S. PATENT DOCUMENTS

| | | | |
|---|---|---|---|
| 7,350,201 B2 * | 3/2008 | Ferri et al. | 717/168 |
| 7,356,679 B1 * | 4/2008 | Le et al. | 717/176 |
| 7,379,982 B2 * | 5/2008 | Tabbara | 717/168 |
| 7,788,350 B2 * | 8/2010 | Ferri et al. | 717/178 |
| 8,468,518 B2 * | 6/2013 | Wipfel | 717/174 |
| 2004/0268345 A1 * | 12/2004 | Lodwick et al. | 717/176 |
| 2005/0050539 A1 * | 3/2005 | Burkhardt et al. | 717/174 |
| 2006/0123414 A1 * | 6/2006 | Fors et al. | 717/177 |
| 2006/0277542 A1 * | 12/2006 | Wipfel | 717/174 |
| 2010/0017798 A1 * | 1/2010 | Burkhardt et al. | 717/174 |

OTHER PUBLICATIONS

Richard R. Linde; Operating system penetration; ACM 1975, pp. 361-368; <http://dl.acm.org/citation.cfm?id=1500018>.*
Richard S. Hall et al; A Cooperative Approach to Support Software Deployment Using the Software Dock; 1999 ICSE, pp. 174-183; <http://dl.acm.org/citation.cfm?id=302463>.*

(Continued)

*Primary Examiner* — Thuy Dao
*Assistant Examiner* — Cuong V Luu
(74) *Attorney, Agent, or Firm* — Jackson Walker L.L.P.

(57) ABSTRACT

In accordance with embodiments of the present disclosure, a method may include extracting an operating system install image from a source installation package. The method may also include receiving target information regarding information handling resources of a target information handling system. The method may further include generating executable custom scripts based on an identity of the operating system and the target information, the custom scripts configured to, when executed by the target information handling system, initiate execution of the operating system install image and perform target information handling system-based customizations to the operating system based on the target information.

12 Claims, 3 Drawing Sheets

(56) References Cited

OTHER PUBLICATIONS

Jorrit N. Herder et al.; Minix 3 a highly reliable self-repairing operating system; 2006 ACM; pp. 80-89; <http://dl.acm.org/citation.cfm?id=1151391>.*

David B. Stewart et al.; The Chimera I1 Real-Time Operating System for Advanced Sensor-Based Control Applications; 1992 IEEE; pp. 1282-1295; <http://ieeexplore.ieee.org/stamp/stamp.jsp?tp=&arnumber=199456>.*

Orran Krieger; K42 building a complete operating system; 2006 ACM; pp. 133-145; <http://dl.acm.org/citation.cfm?id=1217949>.*

David R. Cheriton et al; A Caching Model of Operating System Kernel Functionality; 1994 USENIX; 15 pages; <http://dl.acm.org/citation.cfm?id=1267652>.*

Microsoft Computer Dictionary, Fifth Edition, Microsoft Press, 2002, p. 300.

* cited by examiner

SYSTEMS AND METHODS FOR DEPLOYING A CUSTOMIZED OPERATING SYSTEM

TECHNICAL FIELD

The present disclosure relates in general to information handling systems, and more particularly to deployment of a customized operating system to a target information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As is known in the art, information handling systems typically have operating systems installed thereon. Generally speaking, an operating system may be any program of executable instructions, or aggregation of programs of executable instructions, configured to manage and/or control the allocation and usage of hardware resources and provide an interface between such hardware resources and application programs hosted by the operating system. Often, it is desirable to customize various configuration parameters of an operating system, depending on the hardware resources of the information handling system, user credentials for the information handling system, and/or user preferences.

In situations in which a user or administrator manages a large number of information handling systems, it may be desirable to employ automation to deploy customized operating systems to such a large number of information handling systems, as manual deployment may be time consuming and costly. However, many operating systems use stateless technologies as their boot processes and are unable to, with traditional approaches, use automation to apply customization during the installation process.

SUMMARY

In accordance with the teachings of the present disclosure, the disadvantages and problems associated deployment of a customized operating system to a target information handling system have been reduced or eliminated.

In accordance with embodiments of the present disclosure, an information handling system may include a processor and a memory communicatively coupled to the processor and having stored thereon a program of instructions. The instructions may be configured to, when read and executed by the processor: (i) extract an operating system install image from a source installation package; (ii) receive target information regarding information handling resources of a target information handling system; and (iii) generate executable custom scripts based on an identity of the operating system and the target information, the custom scripts configured to, when executed by the target information handling system, initiate execution of the operating system install image and perform target information handling system-based customizations to the operating system based on the target information.

In accordance with these and other embodiments of the present disclosure, a method may include extracting an operating system install image from a source installation package. The method may also include receiving target information regarding information handling resources of a target information handling system. The method may further include generating executable custom scripts based on an identity of the operating system and the target information, the custom scripts configured to, when executed by the target information handling system, initiate execution of the operating system install image and perform target information handling system-based customizations to the operating system based on the target information.

In accordance with these and other embodiments of the present disclosure, an article of manufacture may include a computer readable medium and computer-executable instructions carried on the computer readable medium, the instructions readable by a processor, the instructions, when read and executed, for causing the processor to: (i) extract an operating system install image from a source installation package; (ii) receive target information regarding information handling resources of a target information handling system; and (iii) generate executable custom scripts based on an identity of the operating system and the target information, the custom scripts configured to, when executed by the target information handling system, initiate execution of the operating system install image and perform target information handling system-based customizations to the operating system based on the target information.

Technical advantages of the present disclosure will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
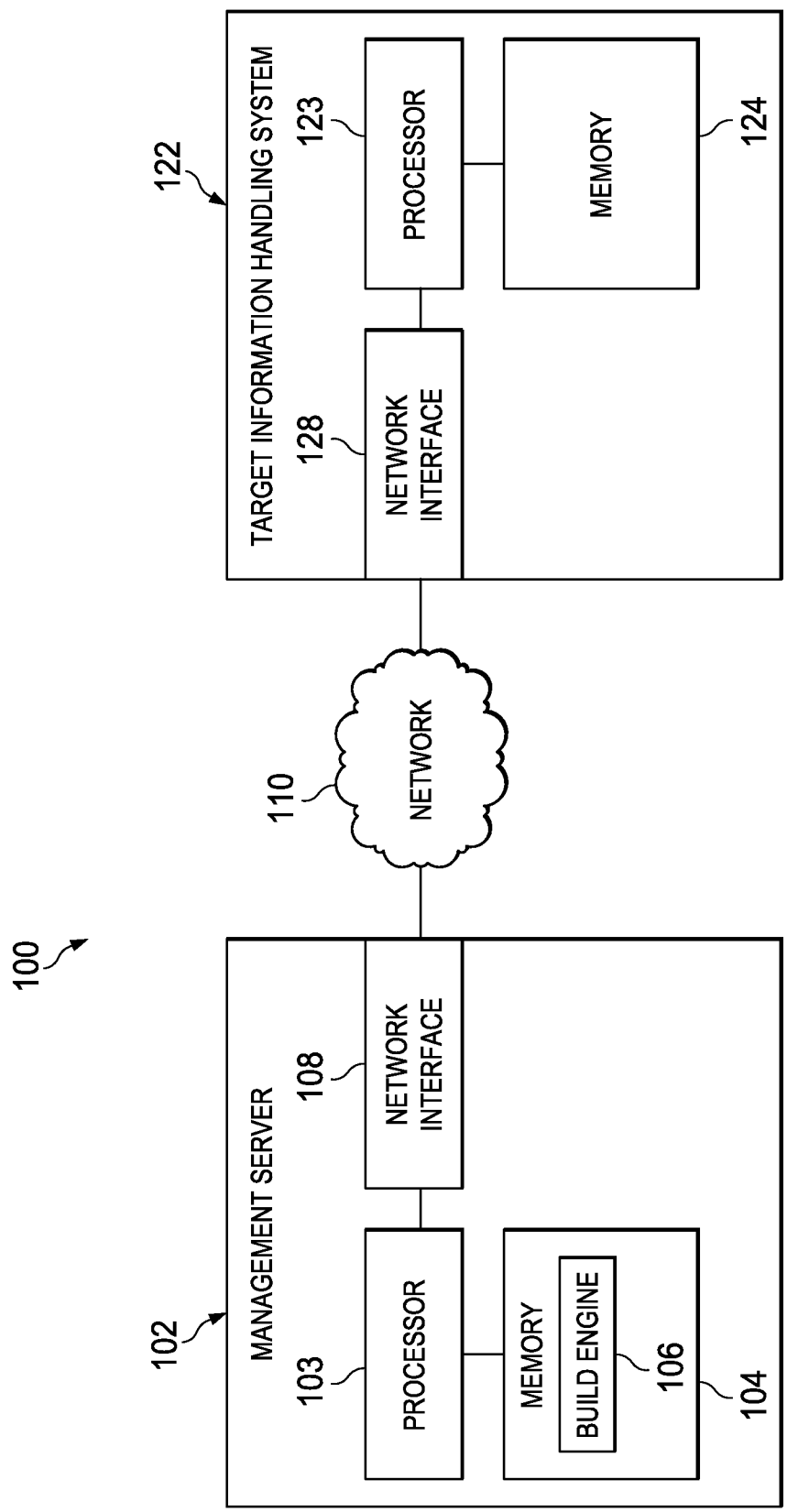
FIG. 1 illustrates a block diagram of an example system for deploying a customized operating system to a target information handling system, in accordance with certain embodiments of the present disclosure.
Figure 2:
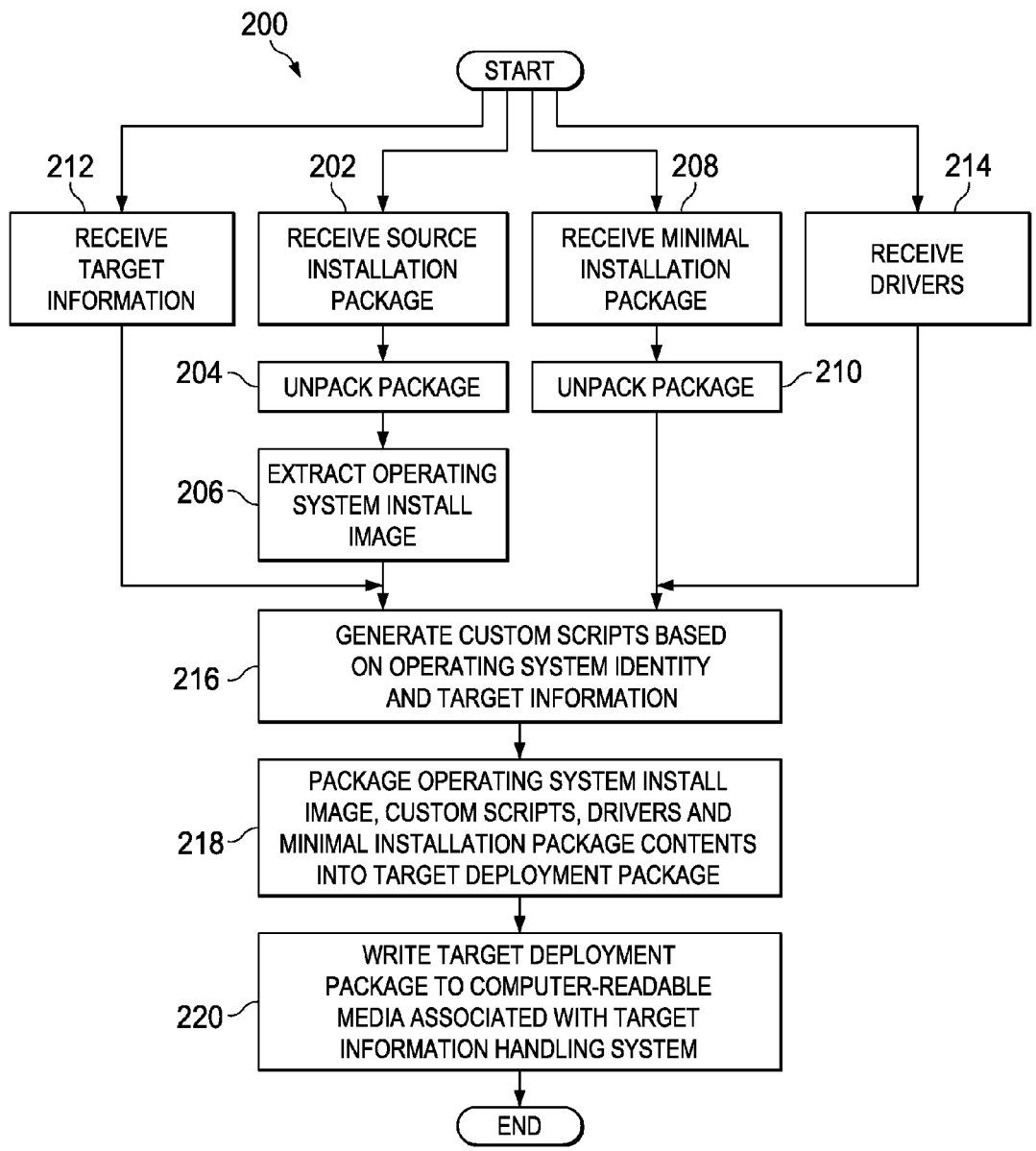
FIG. 2 illustrates a flow chart of an example method for generating a customized target deployment package, in accordance with certain embodiments of the present disclosure.
Figure 3:
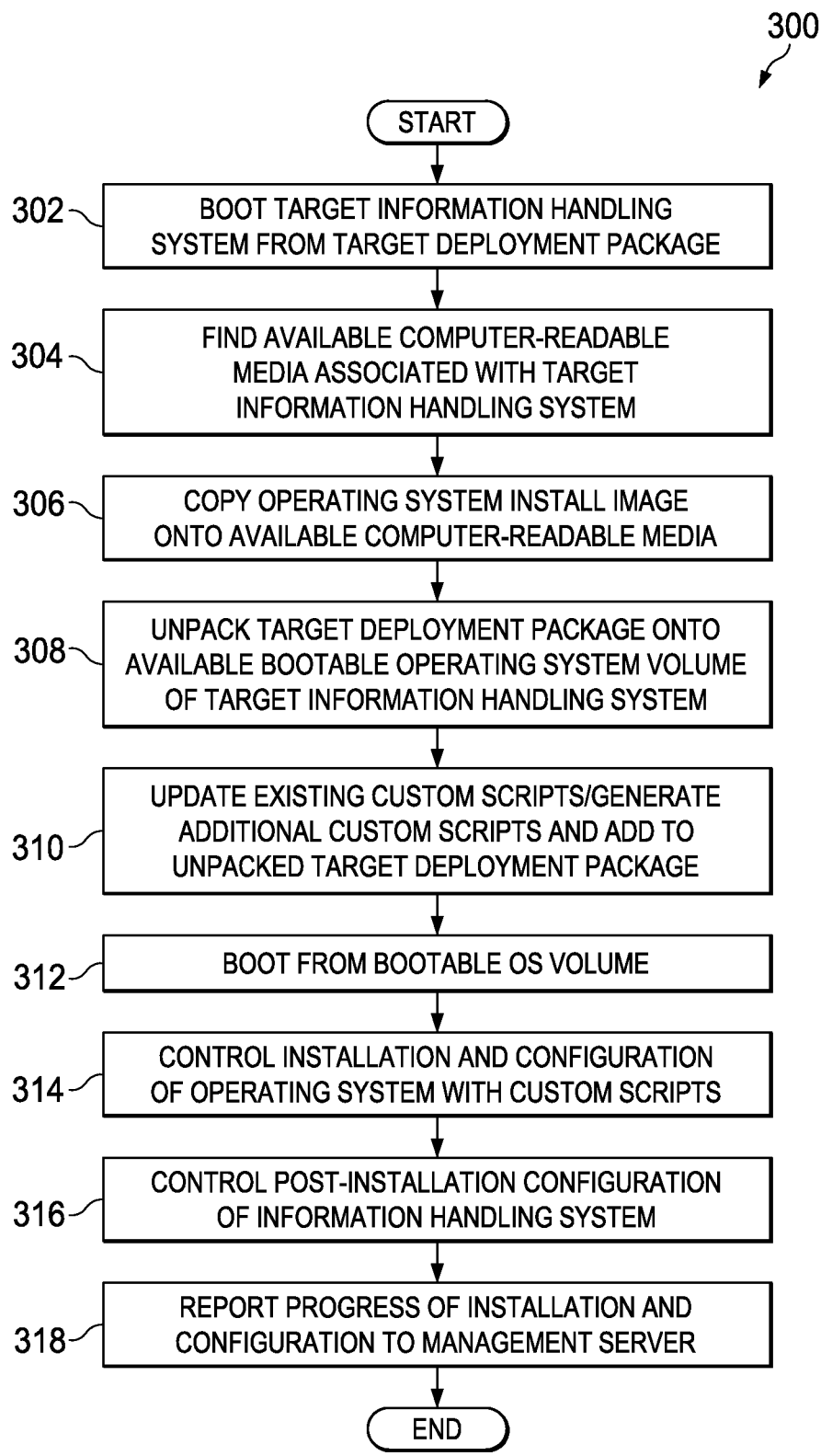
FIG. 3 illustrates a flow chart of an example method for deploying a customized operating system from a customized deployment package, in accordance with certain embodiments of the present disclosure.

Preferred embodiments and their advantages are best understood by reference to FIGS. 1 through 3, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more busses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems, busses, memories, I/O devices and/or interfaces, storage resources, network interfaces, motherboards, and/or any other components and/or elements of an information handling system.

FIG. 1 illustrates a block diagram of an example system for generating client device-specific applications, in accordance with certain embodiments of the present disclosure. As shown in FIG. 1, system 100 may include a management server 102, a target information handling system 122, and a network 110 communicatively coupling management server 102 and target information handling system 122 to one another.

Management server 102 may generally comprise an information handling system. In some embodiments, management server 102 may be a server. In other embodiments, management server 102 may be a personal computer (e.g., a desktop computer or a portable computer). As depicted in FIG. 1, management server 102 may include a processor 103, a memory 104 communicatively coupled to processor 103, and a network interface 108 communicatively coupled to processor 103.

Processor 103 may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of management server 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to management server 102 is turned off.

As shown in FIG. 1, memory 104 may have stored thereon build engine 106. As described in greater detail elsewhere in this disclosure, build engine 106 may include any system, device, or apparatus configured to generate an installation package for deploying a customized operating system to target information handling system 122. In some embodiments, build engine 106 may be implemented as a program of instructions that may be read by and executed on processor 103 to carry out the functionality of build engine 106.

Network interface 108 may comprise any suitable system, apparatus, or device operable to serve as an interface between management server 102 and network 110. Network interface 108 may enable management server 102 to communicate using any suitable transmission protocol and/or standard, including without limitation, all transmission protocols and/or standards enumerated below with respect to the discussion of network 110. In these and other embodiments, network interface 108 may comprise a network interface card, or "NIC."

In addition to processor 103, memory 104, and network interface 108, management server 102 may include one or more other information handling resources.

Network 110 may be a network and/or fabric configured to couple management server 102 and target information handling system 122 to each other and/or one or more other information handling systems. In these and other embodiments, network 110 may include a communication infrastructure, which provides physical connections, and a management layer, which organizes the physical connections and information handling systems communicatively coupled to network 110. Network 110 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as data). Network 110 may transmit data via wireless transmissions and/or wire-line transmissions using any storage and/or communication protocol, including without limitation, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or any other transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

Target information handling system 122 may generally comprise an information handling system. In some embodiments, target information handling system 122 may be a server. In other embodiments, target information handling system 122 may be a personal computer (e.g., a desktop computer or a portable computer). In yet other embodiments, target information handling system 122 may be a mobile device sized and shaped to be readily transported and carried on a person of a user of target information handling system 122 (e.g., a smart phone, a tablet computing device, a handheld computing device, a personal digital assistant, a notebook computer, etc.). As depicted in FIG. 1, target information handling system 122 may include a processor 123, a memory 124 communicatively coupled to processor 123, and a network interface 128 communicatively coupled to processor 123.

Processor 123 may include any system, device, or apparatus configured to interpret and/or execute program instructions and/or process data, and may include, without limitation a microprocessor, microcontroller, DSP, ASIC, or any other digital or analog circuitry configured to interpret and/or execute program instructions and/or process data. In some embodiments, processor 123 may interpret and/or execute program instructions and/or process data stored in memory 124 and/or another component of target information handling system 122.

Memory 124 may be communicatively coupled to processor 123 and may include any system, device, or apparatus configured to retain program instructions and/or data for a period of time (e.g., computer-readable media). Memory 124 may include RAM, EEPROM, a PCMCIA card, flash memory, magnetic storage, opto-magnetic storage, or any suitable selection and/or array of volatile or non-volatile memory that retains data after power to target information handling system 122 is turned off.

Network interface 128 may comprise any suitable system, apparatus, or device operable to serve as an interface between target information handling system 122 and network 110. Network interface 128 may enable target information handling system 122 to communicate using any suitable transmission protocol and/or standard, including any of the protocols and/or standards described above with respect to network 110. In these and other embodiments, network interface 128 may comprise a NIC.

In addition to processor 123, memory 124, and network interface 128, target information handling system 122 may include one or more other information handling resources.

FIG. 2 illustrates a flow chart of an example method 200 for generating a customized target deployment package, in accordance with certain embodiments of the present disclosure. According to some embodiments, method 200 may begin at step 202. As noted above, teachings of the present disclosure may be implemented in a variety of configurations of system 100. As such, the preferred initialization point for method 200 and the order of the steps comprising method 200 may depend on the implementation chosen.

At step 202, build engine 106 may receive a source installation package. In some embodiments, the source installation package may comprise an archive file or disk image of an optical disk (e.g., an ISO file). The source installation package may have been created by a provider (e.g., publisher, manufacturer, vendor, reseller, etc.) of a particular operating system, and may include an operating system install image for installing an operating system, as well as additional provider-provided instructions and/or data for executing an installation of the operating system. However, such source installation package may be generalized, in the sense that the operating system install image and accompanying data and/or instructions are not customized for installation to a particular target information handling system 122, but instead require specific customization to be applied during or after the installation process.

At step 204, build engine 106 may unpack (e.g., unzip, decompress, etc.) the source installation package, and at step 206 may extract the operating system install image therefrom.

At step 208, build engine 106 may receive a minimal installation package. In some embodiments, the minimal installation package may comprise an archive file or disk image of an optical disk (e.g., an ISO file). The minimal installation package may have been created by a provider (e.g., manufacturer, vendor, reseller, etc.) of a particular operating system, and may include minimal instructions and/or data for executing the minimal installation package (e.g., a "thin" operating system and network communication drivers). At step 210, build engine 106 may unpack (e.g., unzip, decompress, etc.) the minimal installation package.

At step 212, build engine 106 may receive target information regarding information handling resources of target information handling system 122. Such target information may include, without limitation, information regarding available computer-readable media associated with target information handling system 122, network connectivity of target information handling system 122, processing resources, peripheral devices, etc. Build engine 106 may receive some or all of the target information from target information handling system 122 (e.g., via network 110), from another information handling system (not explicitly shown) communicatively coupled to network 110 (e.g., pre-compiled target information stored on such other information handling system), and/or from computer-readable media associated with management server 102 (e.g., pre-compiled target information stored on memory 104 and/or other computer-readable media integral to or attached to management server 102).

At step 214, build engine 106 may receive drivers associated with information handling resources of target information handling system 102. In some embodiments, one or more drivers may be received from providers (e.g., manufacturer, vendor, reseller) of information handling resources (e.g., downloaded from a provider website via network 110). In other embodiments, one or more drivers may be received from a catalog of drivers maintained by an administrator of management server 102 (e.g., an information handling system or computer-readable media accessible to management server 102 storing a plurality of drivers from which build engine 106 may select and download appropriate drivers). In these and other embodiments, build engine 106 may request a download of such drivers based on target information and/or a determination of the identity of the operating system to be deployed to target information handling system 122.

At step 216, build engine 106 may generate custom scripts based on the target information and the identity of the operating system to be deployed to target information handling system 122. As discussed in greater detail below in reference to FIG. 3, such custom scripts may be executable scripts for controlling installation of the operating system install image, including initiation of installation, custom configuration of the operating system during execution of the operating system install image, post-installation configuration of the information handling system, and reporting of the installation and customization process to management server 102.

At step 218, build engine 106 may package (e.g., zip, compress, etc.) the operating system install image, the custom scripts, the driver, and the contents of the minimal installation package into a target deployment package. In some embodiments, the source installation package may comprise an archive file or disk image of an optical disk (e.g., an ISO file).

At step 220, build engine 106 may write the target deployment package to computer-readable media associated with target information handling system 122 (e.g., memory 124 or other computer-readable media integral to, attached to, or attachable to target information handling system 122). After completion of step 220, method 200 may end.

Although FIG. 2 discloses a particular number of steps to be taken with respect to method 200, method 200 may be executed with greater or lesser steps than those depicted in FIG. 2. In addition, although FIG. 2 discloses a certain order of steps to be taken with respect to method 200, the steps comprising method 200 may be completed in any suitable order. For example, steps 202-206 may be executed before, after, or substantially contemporaneous to any of steps 208, 210, 212, and 214. As another example, steps 208 and 210 may be executed before, after, or substantially contemporaneous to any of steps 212 and 214. As a further example, step 212 may be executed before, after, or substantially contemporaneous to step 214.

Method 200 may be implemented using system 100 or any other system operable to implement method 200. In certain embodiments, method 200 may be implemented partially or fully in software and/or firmware embodied in computer-readable media.

FIG. 3 illustrates a flow chart of an example method 300 for deploying a customized operating system from a customized deployment package, in accordance with certain embodiments of the present disclosure. According to some embodiments, method 300 may begin at step 302. As noted above, teachings of the present disclosure may be implemented in a variety of configurations of system 100. As such, the preferred initialization point for method 300 and the order of the steps comprising method 300 may depend on the implementation chosen.

At step 302, target information handling system 122 may boot from the target deployment package stored on computer-readable media associated with the target information handling system 122, and various components of the target deployment package, including the custom scripts, may begin executing (e.g., on processor 123).

At step 304, the target deployment package may identify available computer-readable media associated with target information handling system 122, and at step 306, may extract (e.g., unzip, decompress) and copy the operating system install image into the available computer-readable media.

At step 308, the target deployment package may unpack (e.g., unzip, decompress) contents of the target deployment package onto an available bootable operating system volume of computer-readable media associated with target information handling system 122.

At step 310, the target deployment package may inventory target information handling system 122 to supplement the target information received at step 212 of method 200, and based on such inventory, update existing custom scripts or generate additional custom scripts to add to the contents of the unpacked target deployment package. In some embodiments, the target deployment package may communicate with management server 102 in order to update and generate new custom scripts. This update and generation of new custom scripts allows for the late binding of information handling resources of target information handling system 122 to the operating system, and accounts for changes to information handling resources made prior to creation of the target deployment package.

At step 312, target information handling system 122 may boot from the bootable operating system volume to which contents of the target deployment package were written, and the custom scripts may again execute.

At step 314, the custom scripts may initiate execution of the operating system install image, and control various aspects of the installation and configuration of the operating system. For example, during its execution, the operating system install image may query for configuration information which it typically received via manual user input. However, custom scripts may reduce or eliminate such need for manual input by automatically providing such information based on target information received at step 216 and/or step 310.

At step 316, once the operating system install image has completed installation of the operating system, the custom scripts may control post-installation configuration of the information handling system. Such configuration may be made to configure parameters or customizations not made during actual installation.

At step 318 (or during execution of any of the steps 302 to 316), the custom scripts may communicate the status of installation and configuration to management server 102. In some embodiments, custom scripts will permit feedback or further instructions from management server 102 during installation and/or configuration in order to address errors occurring during installation. After completion of step 318, method 300 may end.

Although FIG. 3 discloses a particular number of steps to be taken with respect to method 300, method 300 may be executed with greater or lesser steps than those depicted in FIG. 3. In addition, although FIG. 3 discloses a certain order of steps to be taken with respect to method 300, the steps comprising method 300 may be completed in any suitable order.

Method 300 may be implemented using system 100 or any other system operable to implement method 300. In certain embodiments, method 300 may be implemented partially or fully in software and/or firmware embodied in computer-readable media.

Although the present disclosure has been described in detail, it should be understood that various changes, substitutions, and alterations can be made hereto without departing from the spirit and the scope of the disclosure as defined by the appended claims.

What is claimed is:

1. A computer-implemented method comprising:
    extracting an operating system install image from a source installation package;
    receiving target information regarding information handling resources of a target information handling system;
    generating executable custom scripts based on an identity of the operating system and the target information, the custom scripts configured to, when executed by the target information handling system:
        initiate execution of the operating system install image; and
        perform target information handling system-based customizations to the operating system based on the target information;
    packaging the operating system install image and the custom scripts in a target deployment package;
    writing the target deployment package to computer-readable media associated with the target information handling system, wherein the target deployment package comprises an archive file for an optical disc;
    receiving drivers based on an identity of the operating system and the target information; and
    packaging the drivers in the target deployment package.

2. The method of claim 1, the custom scripts further configured to, when executed by the target information handling system, communicate to a management server status information regarding installation and configuration of the operating system.

3. The method of claim 1, the custom scripts configured to perform target information handling system-based customizations during execution of the operating system install image.

4. The method of claim 1, the custom scripts configured to perform target information handling system-based customizations after execution of the operating system install image.

5. An information handling system comprising:
a processor; and
a memory communicatively coupled to the processor and having stored thereon a program of instructions, the instructions configured to, when read and executed by the processor:
extract an operating system install image from a source installation package;
receive target information regarding information handling resources of a target information handling system;
generate executable custom scripts based on an identity of the operating system and the target information, the custom scripts configured to, when executed by the target information handling system:
initiate execution of the operating system install image; and
perform target information handling system-based customizations to the operating system based on the target information;
package the operating system install image and the custom scripts in a target deployment package;
write the target deployment package to computer-readable media associated with the target information handling system, wherein the target deployment package comprises an archive file for an optical disc;
receive drivers based on an identity of the operating system and the target information; and
package the drivers in the target deployment package.

6. The information handling system of claim 5, the custom scripts further configured to, when executed by the target information handling system, communicate to a management server status information regarding installation and configuration of the operating system.

7. The information handling system of claim 5, the custom scripts configured to perform target information handling system-based customizations during execution of the operating system install image.

8. The information handling system of claim 5, the custom scripts configured to perform target information handling system-based customizations after execution of the operating system install image.

9. An article of manufacture comprising:
a non-transitory computer readable medium; and
computer-executable instructions carried on the computer readable medium, the instructions readable by a processor, the instructions, when read and executed, for causing the processor to:
extract an operating system install image from a source installation package;
receive target information regarding information handling resources of a target information handling system;
generate executable custom scripts based on an identity of the operating system and the target information, the custom scripts configured to, when executed by the target information handling system:
initiate execution of the operating system install image; and
perform target information handling system-based customizations to the operating system based on the target information;
package the operating system install image and the custom scripts in a target deployment package; and
write the target deployment package to computer-readable media associated with the target information handling system, wherein the target deployment package comprises an archive file for an optical disc;
receive drivers based on an identity of the operating system and the target information; and
package the drivers in the target deployment package.

10. The article of claim 9, the custom scripts further configured to, when executed by the target information handling system, communicate to a management server status information regarding installation and configuration of the operating system.

11. The article of claim 9, the custom scripts configured to perform target information handling system-based customizations during execution of the operating system install image.

12. The article of claim 9, the custom scripts configured to perform target information handling system-based customizations after execution of the operating system install image.

* * * * *